United States Patent
Kim et al.

(10) Patent No.: US 11,614,269 B2
(45) Date of Patent: Mar. 28, 2023

(54) REFRIGERATOR DOOR AND MANUFACTURING METHOD THEREOF

(71) Applicant: LG Electronics Inc., Seoul (KR)

(72) Inventors: Jonggoo Kim, Seoul (KR); Taeyoung Kim, Seoul (KR); Kisoo Oh, Seoul (KR); ChangJu Kang, Seoul (KR); Hyunkeun Cho, Seoul (KR)

(73) Assignee: LG Electronics Inc., Seoul (KR)

(*) Notice: Subject to any disclaimer, the term of this patent is extended or adjusted under 35 U.S.C. 154(b) by 43 days.

(21) Appl. No.: 16/952,517

(22) Filed: Nov. 19, 2020

(65) Prior Publication Data

US 2021/0190412 A1 Jun. 24, 2021

(30) Foreign Application Priority Data

Dec. 18, 2019 (KR) .......... 10-2019-0169663

(51) Int. Cl.
| | | |
|---|---|---|
| *F25D 23/02* | (2006.01) | |
| *B32B 5/18* | (2006.01) | |
| *B32B 5/32* | (2006.01) | |
| *B32B 15/04* | (2006.01) | |
| *B32B 15/095* | (2006.01) | |

(Continued)

(52) U.S. Cl.
CPC .......... *F25D 23/028* (2013.01); *B29C 44/18* (2013.01); *B29C 45/1756* (2013.01); *B32B 5/18* (2013.01); *B32B 5/32* (2013.01); *B32B 15/046* (2013.01); *B32B 15/095* (2013.01); *B32B 2250/03* (2013.01); *B32B 2266/0278* (2013.01); *B32B 2307/304* (2013.01); *B32B 2509/10* (2013.01); *F25D 2201/12* (2013.01)

(58) Field of Classification Search
CPC ... F25D 23/028; F25D 2201/12; B29C 44/18; B29C 45/1756; B32B 5/18; B32B 5/32; B32B 15/046; B32B 15/095
See application file for complete search history.

(56) References Cited

U.S. PATENT DOCUMENTS

| | | | | |
|---|---|---|---|---|
| 5,048,233 A | * | 9/1991 | Gidseg | F25D 23/02 49/501 |
| 5,389,317 A | * | 2/1995 | Grimmer | B29C 44/1233 264/46.7 |

(Continued)

FOREIGN PATENT DOCUMENTS

| | | |
|---|---|---|
| EP | 0249299 | 6/1987 |
| KR | 1020100046525 | 5/2010 |

(Continued)

OTHER PUBLICATIONS

Extended European Search Report in European Appln. No. 20210982.3, dated May 12, 2021, 8 pages.

*Primary Examiner* — James O Hansen
(74) *Attorney, Agent, or Firm* — Fish & Richardson P.C.

(57) ABSTRACT

A refrigerator door includes an outer plate that is made of metal and defines a front surface of the refrigerator door, a door liner that is coupled to the outer plate and defines a rear surface of the refrigerator door, an insulator disposed in a space defined between the outer plate and the door liner and made of polyurethane, and a foam cushion disposed at a rear surface of the outer plate and configured to expand or contract based on a change of a volume of the insulator.

7 Claims, 6 Drawing Sheets

(51) Int. Cl.
*B29C 45/17* (2006.01)
*B29C 44/18* (2006.01)

(56) References Cited

U.S. PATENT DOCUMENTS

| | | | | |
|---|---|---|---|---|
| 5,533,311 | A * | 7/1996 | Tirrell | E06B 7/2312 |
| | | | | 49/501 |
| 6,433,032 | B1 * | 8/2002 | Hamilton | C08G 18/10 |
| | | | | 521/174 |
| 2008/0231159 | A1 * | 9/2008 | Lee | F25D 29/005 |
| | | | | 312/405 |
| 2013/0328472 | A1 * | 12/2013 | Shim | B21D 22/205 |
| | | | | 413/8 |

FOREIGN PATENT DOCUMENTS

| | | |
|---|---|---|
| KR | 101348602 | 1/2014 |
| KR | 1020140027442 | 3/2014 |
| KR | 101870509 | 6/2018 |

* cited by examiner

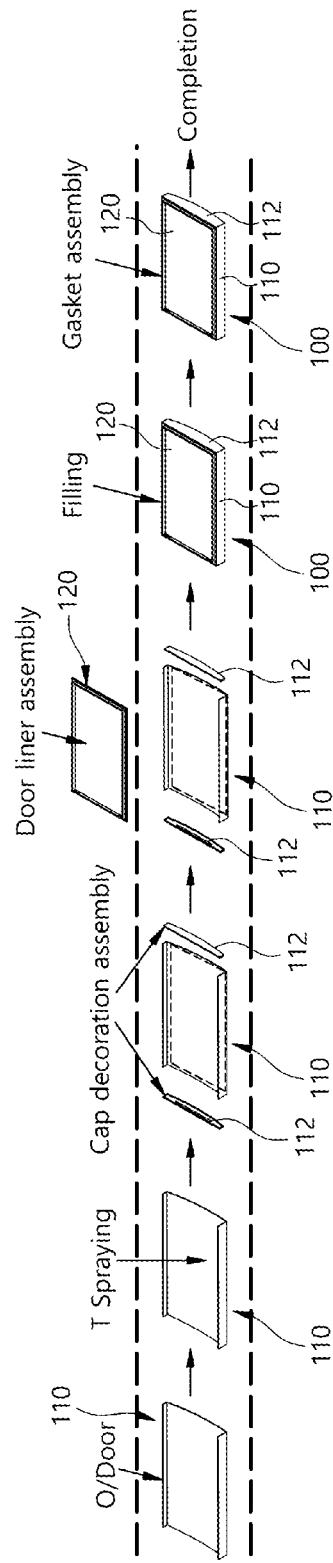

REFRIGERATOR DOOR AND MANUFACTURING METHOD THEREOF

CROSS-REFERENCE TO RELATED APPLICATION

The present application claims priority to Korean Patent Application No. 10-2019-0169663, filed on Dec. 18, 2019, the entire contents of which are incorporated herein for all purposes by reference.

TECHNICAL FILED

The present disclosure relates to a refrigerator door. Particularly, the present disclosure relates to a refrigerator door including a foam cushion applied by spraying and a manufacturing method for the refrigerator door.

BACKGROUND

A refrigerator is a home appliance that can store food at low temperatures in an internal storage space that can be opened and closed by a refrigerator door.

For example, the refrigerator can store food in an optimal state by cooling the inside of the storage space using cold air generated through heat exchange with refrigerant circulating in a refrigeration cycle.

In some cases, a refrigerator can be large and perform multiple functions in accordance with the change of dietary life and the trend of high-end products, and there are various designs of the refrigerator according to a user's taste.

In some cases, a refrigerator door, which defines an exterior of the refrigerator, may be the most important factor in the design of the exterior. In some cases, the exterior of the door of a refrigerator is made of metal to foam diverse and luxurious exteriors.

In some cases, where the refrigerator has the exterior made of a metal material, liquid foam injected to form an insulator may leave some unfilled areas inside the door. In some cases, the insulator formed by the liquid foam may have multiple sectional areas. As a result, the exterior of the front surface of the door may be deformed or curved.

In some cases, a small curved area on the front surface may appear prominent in reflection of light.

In some cases, a door for a refrigerator includes a foam heat blocking member provided help to prevent the surface of the door from being curved.

In some cases, gas of the liquid foam may be discharged, and the liquid foam may be contracted when the liquid foam has increased pressure and expanded during the injection of the liquid foam. The surface of the door may be curved due to the change of the volume of the liquid foam.

In some cases, during the injection of the liquid foam, the insulator may not be evenly formed on the entirety of the door, and the insulator may have different thicknesses due to foam unevenness, so the surface of the door may be curved.

In some cases, a combining force between the liquid foam and the foam heat blocking member may be weak. Accordingly, when the liquid foam hardens and the insulator is formed, a space may be defined between the foam heat blocking member and the insulator, and thus the surface of the door may be curved.

In some cases, a refrigerator includes a refrigerator door and a curve prevention sheet provided in the door. The curve prevention sheet may help to prevent an outer plate from being curved during the expansion and contraction of liquid foam injected to form an insulator. However, in some cases, the structure of the curve prevention sheet may be complicated, and thus material cost may be increased. In some cases, such a sheet is manually attached to the surface of the door, and thus productivity may be decreased, and defects may occur depending on the ability of a worker.

SUMMARY

The present disclosure describes a refrigerator door having a double foam structure that helps to prevent an exterior of the door from rippling.

The present disclosure also describes a double foaming method to help to prevent the rippling of the refrigerator door.

The present disclosure further describes a refrigerator door including a soft foam cushion formed by an automatic application of a polyurethane foam to thereby prevent or reduce the rippling of the exterior of the door.

The present disclosure further describes a method for manufacturing the refrigerator door.

According to one aspect of the subject matter describe in this application, a refrigerator door includes an outer plate that is made of metal and defines a front surface of the refrigerator door, a door liner that is coupled to the outer plate and defines a rear surface of the refrigerator door, an insulator disposed in a space defined between the outer plate and the door liner and made of polyurethane, and a foam cushion disposed at a rear surface of the outer plate and configured to expand or contract based on a change of a volume of the insulator.

Implementations according to this aspect may include one or more of the following features. For example, the foam cushion can be coated on the rear surface of the outer plate by a sprayer. In some examples, the foam cushion can be made of soft polyurethane. In some examples, a hardness of the foam cushion can be 20 to 30.

In some implementations, wherein the insulator is made of rigid polyurethane. In some examples, a hardness of the insulator can be 60 to 70. In some examples, a thickness of the foam cushion can be in a range from 2 to mm to 3 mm. In some examples, the foam cushion can include a polyurethane layer that is applied on the rear surface of the outer plate and has a first thickness, where the polyurethane layer is configured to expand to thereby define the foam cushion having a second thickness greater than the first thickness.

In some examples, the foam cushion can be disposed on an entire portion of the rear surface of the outer plate. In some examples, the insulator can be disposed between the door liner and the foam cushion on the rear surface of the outer plate.

According to another aspect, a method for manufacturing a refrigerator door includes supplying an outer plate, performing a spraying process on a rear surface of the outer plate, coupling a cap decoration to an upper or lower end of the outer plate, coupling a door liner to the outer plate to thereby define a space between the door liner and the outer plate, filling liquid foam in the space defined between the outer plate and the door liner, and coupling a gasket to a perimeter of the door liner.

Implementations according to this aspect may include one or more of the following features. For example, the spraying process can include applying soft polyurethane to the rear surface of the outer plate to thereby define a foam cushion. In some examples, the soft polyurethane applied to the rear surface of the outer plate has a first thickness.

In some implementations, the foam cushion can have a second thickness that is greater than the first thickness and in a range from 2 mm to 3 mm. In some examples, filling the liquid foam can include providing an insulator to the space between the outer plate and the door liner.

In some implementations, filling the liquid foam can include injecting undiluted solution of rigid polyurethane into the space between the outer plate and the door liner. In some examples, the spraying process can include applying soft polyurethane to the rear surface of the outer plate to thereby define a foam cushion, where an elasticity of the foam cushion can be greater than an elasticity of the insulator.

In some examples, filling the liquid foam can be performed based on the soft polyurethane on the rear surface of the outer plate being dried. In some examples, filling the liquid foam can include allowing the foam cushion to expand or contract in response to contraction or expansion of the insulator to thereby fill a gap between the outer plate and the door liner.

In some examples, a hardness of the foam cushion can be 20 to 30, and a hardness of the insulator can be 60 to 70.

In some implementations, the foam cushion and the insulator can be formed by double foaming inside the refrigerator door. For example, the foam cushion in contact with the insulator can be formed by an automatic spray application method. Accordingly, the process of forming the foam cushion and the insulator can be simplified more than the process of forming a curve prevention sheet, thereby improving manufacturing efficiency and preventing defects. Furthermore, a soft foam cushion can help to decrease a material cost.

In addition, the foam cushion can be made of the soft polyurethane (PU) that has an elasticity greater than the elasticity of the insulator made of rigid polyurethane (PU). Accordingly, the foam cushion can contract or expand according to the pressure of the insulator, thereby filling a gap inside the door.

In some examples, the spraying process in the manufacturing method can improve the manufacturing efficiency of the door and prevent or reduce defect thereof.

In some examples, the cabinet of the refrigerator can include the insulator and the foam cushion formed by double foaming, thereby improving the manufacturing efficiency of the refrigerator and decreasing defect thereof.

In some examples, a soft foam cushion can be formed by the automatic application of the polyurethane foam, thereby helping to prevent the exterior of the door or the cabinet of a refrigerator from rippling and to increase work efficiency.

BRIEF DESCRIPTION OF THE DRAWINGS

FIGS. 5A to 5F illustrate the process of manufacturing the refrigerator door.

DETAILED DESCRIPTION

Hereinbelow, a refrigerator door will be described in detail with reference to the accompanying drawings.

In the following description, for the convenience of description and understanding, the refrigerator of a bottom freezer type in which a freezer compartment is provided under a refrigerating compartment is illustrated. The present disclosure may be applied to all types of refrigerators in which the insulator is filled inside the refrigerator door and at least a portion of the exterior of the refrigerator door is formed of metal.

Figure 1:
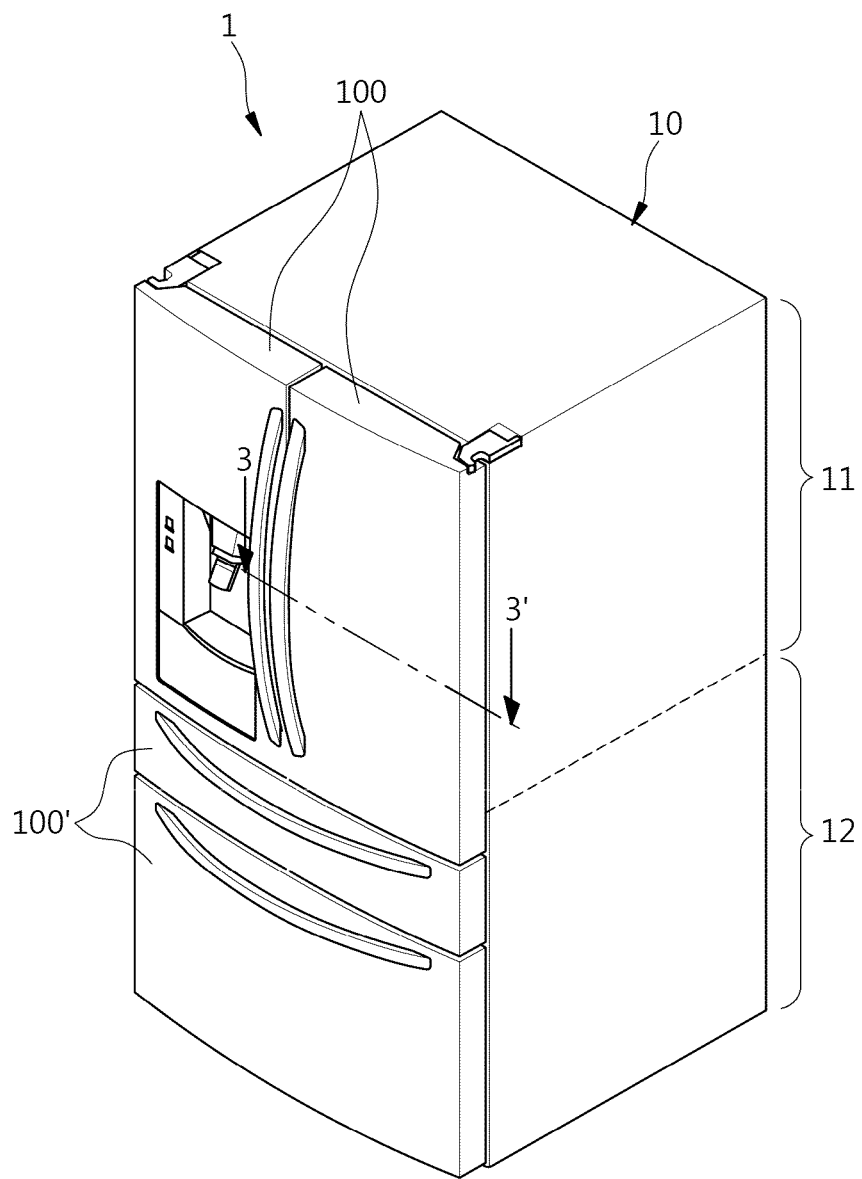
FIG. 1 is a perspective view illustrating an example of a refrigerator having a refrigerator door.

FIG. 1 is a perspective view illustrating an example of the refrigerator having a refrigerator door.

As illustrated in FIG. 1, an exterior of the refrigerator 1 may be defined by a cabinet 10 having storage space therein and the door 100 and 100' that are configured to open and close the storage space defined in the cabinet 10.

In some implementations, the cabinet 10 can have a hexahedral shape having an open front surface, and the storage space inside the cabinet 10 can be partitioned into an upper space and a lower space by a barrier.

For example, the storage space inside the cabinet 10 can have the refrigerating compartment 11 formed in the upper space of the cabinet 10 and the freezer compartment 12 famed in the lower space of the cabinet 10 relative to the barrier.

The door 100 and 100' can include a refrigerating compartment door 100 configured to open and close the refrigerating compartment 11, and a freezer compartment door 100' configured to open and close the freezer compartment 12.

The refrigerating compartment door 100 can be provided in a pair at left and right opposite sides and mounted to the opposite sides of the cabinet 10 to swing.

The refrigerating compartment door 100 can selectively open and close the refrigerating compartment 11 by swinging.

In some implementations, the pair of refrigerating compartment doors 100 can swing independently of each other, and thus can partially open and close the front surface of the refrigerating compartment 11.

The freezer compartment door 100' may be provided in the freezer compartment 12 and may have the same structure as a drawer which can be slidably opened and closed. Accordingly, the freezer compartment door 100' may open and close the freezer compartment 12 by being slidably opened and closed.

In some implementations, a swinging door or a drawer may be applied irrespective of the operation method thereof. Hereinafter, for the convenience of understanding and description, the description will be made on the basis of the refrigerating compartment door 100 (hereinafter, simply referred to as a door 100) having a swinging structure.

Figure 2:
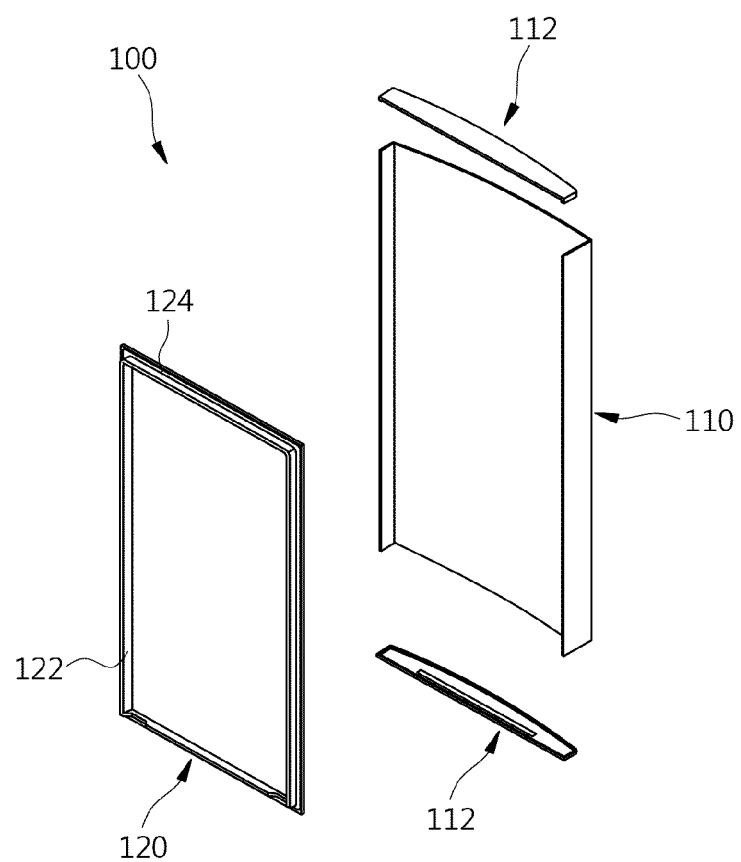
FIG. 2 is an exploded perspective view illustrating example components of the refrigerator door.
Figure 3:
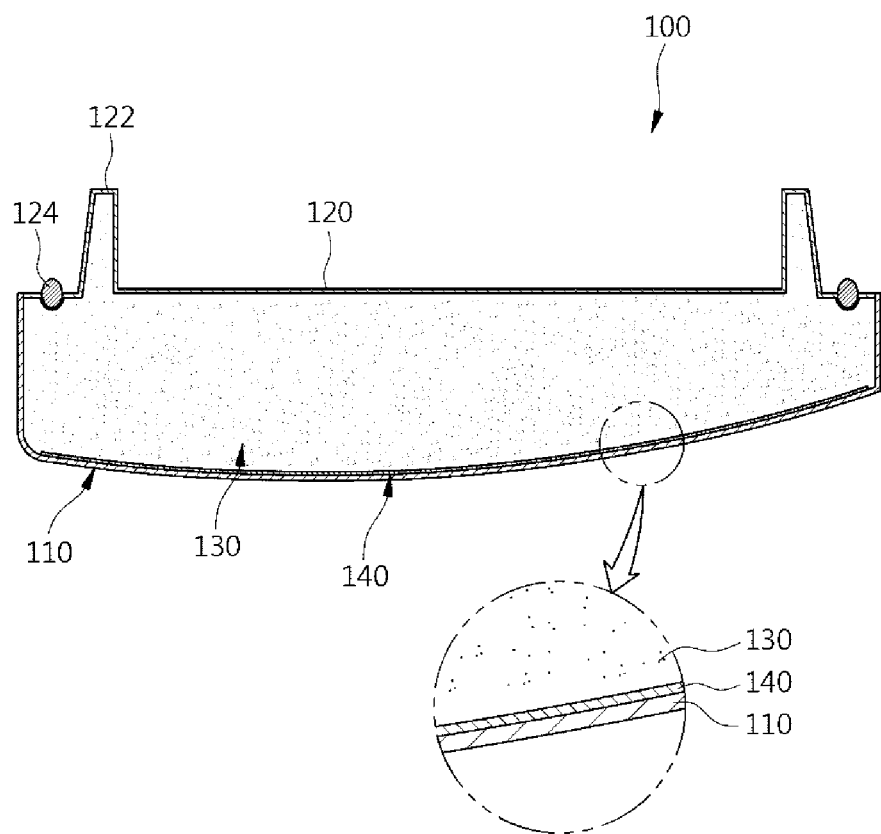
FIG. 3 is a cross-sectional view taken along line 3-3' of FIG. 1.

FIG. 2 is an exploded perspective view of the refrigerator door of present disclosure. FIG. 3 is a cross-sectional view taken along line 3-3' of FIG. 1.

As illustrated in these drawings, the refrigerator door may include: an outer plate 110 constituting the exterior of the front surface of the door and made of metal; a door liner 120 combined with the outer plate 110 and constituting an exterior of a rear surface of the door; the insulator 130 provided in space between the outer plate 110 and the door liner 120 and made of the polyurethane liquid foam; and a foam cushion 140 formed on the rear surface of the outer plate 110 and having volume changing in correspondence to the change of the volume of the insulator 130.

Accordingly, the door 100 may have exterior thereof roughly constituted by the outer plate 110 constituting the exterior of the front surface of the door and the door liner 120 constituting the exterior of the rear surface of the door 100, and may further include cap decorations 112 constituting the upper and lower surfaces of the door 100.

That is, as illustrated in FIG. 2, each of the cap decorations 112 may be provided on each of the upper and lower ends of the outer plate 110 and the door liner 120 and may constitute the exterior of the upper and lower surfaces of the door 100.

In some examples, at least one of the cap decorations 112 can be omitted according to the shape and structure of the door 100.

The outer plate 110 may be made of metal such as a stainless steel plate or a colored steel plate. Additionally, the outer plate 110 may constitute a portion of the surface of the perimeter of the door 100 by bending a plate-shaped metal material.

The front surface of the outer plate 110 exposed to the outside may be subjected to a surface process treatment to have smooth feeling.

In addition, an anti-fingerprint coating or a diffused reflection prevention coating may be provided on the front surface of the outer plate 110, and a film may be attached to or printed on the front surface of the outer plate to implement a color or a pattern thereon.

Furthermore, a portion of the outer plate 110 corresponding to the front surface of the door 100 may be configured to be round. That is, the front surface of the outer plate 110 of the door 100 may be configured to have the shape of a rounded surface.

The door liner 120 may be injection molded out of plastic, and may be combined with the perimeter of the outer plate 110.

The door liner 120 may constitute the rear surface of the door 100, and may have a door dike 122 for mounting a door basket thereto and a corrugated structure formed integrally with the liner for mounting other components constituting the rear surface of the door 100 thereto.

Additionally, a gasket 124 may be provided along the perimeter of the door liner 120.

Space may be defined between the outer plate 110 and the door liner 120, and the insulator 130 may be formed in the space between the outer plate 110 and the door liner 120.

The insulator 130 may be formed by the liquid foam injected in the state in which the outer plate 110 and the door liner 120 are combined with each other. That is, the insulator 130 may be formed by the liquid foam injected after the outer plate 110, the door liner 120, and the cap decorations 112 are combined with each other and predetermined empty space is defined therein.

Furthermore, the liquid foam can include polyurethane (PU). For example, the insulator 130 can be made of rigid polyurethane (PU).

The insulator 130 can be made of polyurethane (PU) having the hardness of 60 to 70.

The hardness can be scaled as a normalized/relative value with respect to a maximum value of a measurement range of a tester (e.g., durometer). For example, the hardness can be measured by an Asker C type soft part hardness tester, which can measure a hardness within a scale from 0 to 100 points corresponding to a minimum spring force (539 mN) to a maximum spring force (8379 mN), respectively. In the same or other implementations, the hardness can be measured by various types of testers in a different unit such as a Shore unit.

The insulator 130 may completely fill the inside of the door 100, so heat exchange between the inside of the refrigerator and the outside thereof can be prevented.

In addition, such an insulator 130 may be in close contact with the outer plate 110 and the door liner 120, and may prevent the door 100 from being transformed by external impact.

In some implementations, the foam cushion 140 can be provided on the rear surface of the outer plate 110.

The foam cushion 140 is made of soft polyurethane by the automatic application of polyurethane (PU) spray foam. That is, the foam cushion 140 may be made of the soft polyurethane (PU), and may be formed by a spray application method.

The foam cushion 140 may be evenly formed along the inner surface (the rear surface of the outer plate in FIG. 3) of the outer plate 110 by the spray application to have a predetermined thickness and may buffer the expansion and contraction of the liquid foam.

That is, the foam cushion 140 may be formed on the entirety of the rear surface of the outer plate 110, and may be formed in at least an area of the outer plate 110 which is equivalent to the front surface of the door 100.

Accordingly, during the injection of the liquid foam, the liquid foam may be in contact with the foam cushion 140, and may prevent the deformation of the area of the outer plate 110 including the front surface of the door 100.

In some implementations, the foam cushion 140 can be made of the soft polyurethane (PU). For example, the foam cushion 140 can be made of polyurethane (PU) having the hardness of 20 to 30.

In some examples, the foam cushion 140 can be formed on the entirety of the rear surface of the outer plate 110, and can have a thickness of 2 to 3 mm.

The foam cushion 140 may be formed by the spray application method. That is, the foam cushion 140 may be formed by the automatic application of the polyurethane (PU) to the rear surface of the outer plate 110 such that the polyurethane has a thickness of about 0.15 mm. Accordingly, the polyurethane (PU) applied to have a thickness of 0.15 mm can expand and dry after a predetermined time to define the foam cushion 140 having a thickness of about 2 to 3 mm.

For example, the foam cushion 140 can include a polyurethane layer applied by spraying polyurethane to the rear surface of the outer plate 110 to a first thickness (e.g., 0.15 mm). The polyurethane layer can expand such that the thickness of the polyurethane layer increases from the first thickness to a second thickness (e.g., 2 to 3 mm). In some cases, the first and second thicknesses are predetermined.

wherein a thickness of the polyurethane layer is 0.15 mm

Accordingly, the foam cushion 140 and the insulator 130 may be formed by double foaming. That is, the foam cushion 140 and the insulator 130 may be formed by the foaming of the polyurethane (PU).

In addition, the foam cushion 140 may be formed prior to the formation of the insulator 130. That is, the insulator 130 may be formed after the foam cushion 140 is formed on the rear surface of the outer plate 110.

Particularly, the insulator 130 may be formed after the foam cushion 140 is formed by the spray application. That is, the insulator 130 may be formed by the foaming of the polyurethane foam after the foam cushion 140 formed by the spray application has been dried.

The foam cushion 140 may be formed between the insulator 130 and the outer plate 110 to have elasticity. Accordingly, the foam cushion 140 may be in contact with the insulator 130 and may be expanded and contracted according to the contraction and expansion of the insulator 130. That is, the foam cushion 140 may be expanded during the contraction of the insulator 130, and may fill a gap between the insulator 130 and the outer plate 110.

Figure 4:
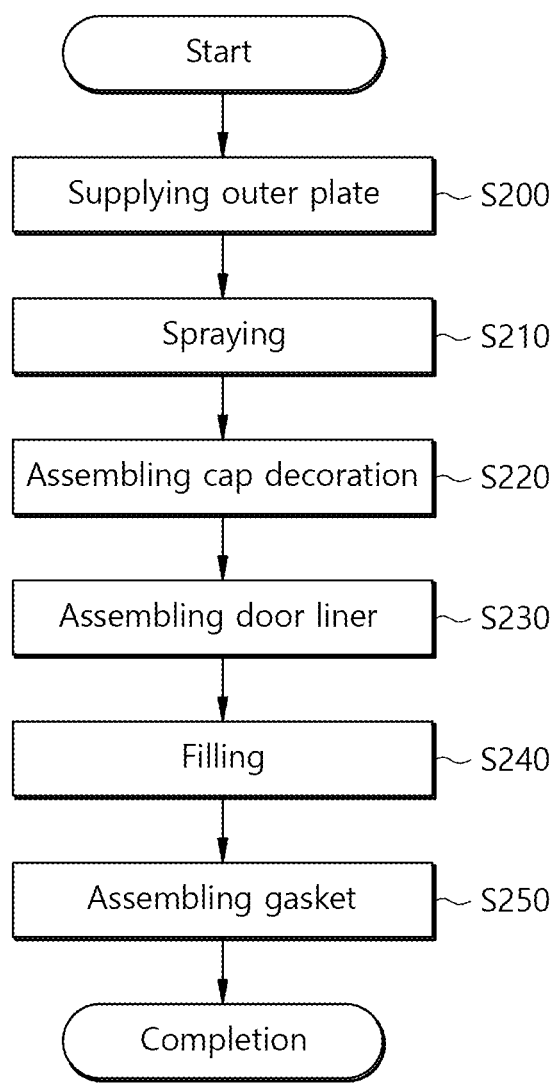
FIG. 4 is a block diagram illustrating an example of a manufacturing method of the refrigerator door.
Figure 6A:
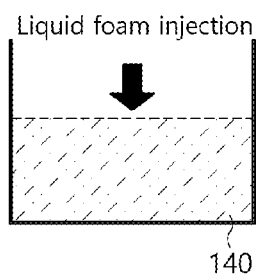
FIGS. 6A, 6B, and 6C are sectional views illustrating example states in which an example foam cushion in the refrigerator door expands and contracts according to contraction and expansion of the insulator.
Figure 6B:
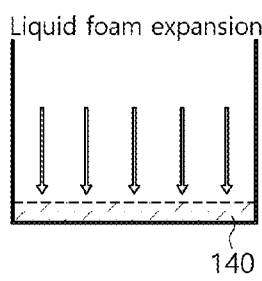
Figure 6C:
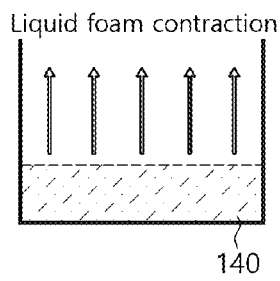

Hereinbelow, a manufacturing method of the refrigerator door will be described. That is, the manufacturing method of the door 100 will be described with reference to FIGS. 4 to 6. FIG. 4 is a block diagram illustrating the manufacturing method of the refrigerator door; FIGS. 5A, 5B, 5C, 5D, 5E, and 5F illustrate the process of manufacturing the refrigerator door; and FIGS. 6A, 6B, and 6C are sectional views illustrating states in which the foam cushion 140 is expanded and contracted according to the contraction and expansion of the insulator 130.

As illustrated in the drawings, the manufacturing method of the refrigerator door can include supplying the outer plate 110 by forming the outer plate 110 (S200), spraying performed on the rear surface of the outer plate 110 (S210), assembling the cap decoration 112 with the upper or lower end of the outer plate 110 (S220), assembling the door liner 120 with the outer plate such that the door liner is spaced apart from the outer plate 110 (S230), filling the liquid foam in the space between the outer plate 110 and the door liner 120 (S240), and assembling the gasket 124 with the perimeter of the door liner 120 (S250).

As illustrated in FIG. 5A, the supplying of the outer plate at S200 is the process of supplying the outer plate 110 formed of a stainless steel plate or plate-shaped metal material.

The spraying S210 is the process of forming the foam cushion 140 by applying the soft polyurethane (PU) to the rear surface of the outer plate 110. That is, as illustrated in FIG. 5B, the spraying S210 is the process of automatically applying the polyurethane (PU) to the rear surface of the outer plate 110, and in the spraying S210, the thickness of the polyurethane (PU) applied to the rear surface of the outer plate 110 can be 0.15 mm.

Accordingly, when the spraying S210 is completed, the foam cushion 140 may be formed on the rear surface of the outer plate 110, and the foam cushion 140 may have a thickness of 2 to 3 mm. That is, the polyurethane (PU) applied to have a thickness of 0.15 mm in the spraying S210 may expand and form the foam cushion 140 having a thickness of about 2 to 3 mm.

After the foam cushion 140 is formed in the spraying S210, the assembling of the cap decorations at S220 and the assembling of the door liner at S230 may be performed as illustrated in FIGS. 5C and 5D. For example, at S220, the cap decoration 112 can be coupled to the upper or lower end of the outer plate 110. At S230, the door liner 120 can be coupled to the outer plate 110 to thereby define a space between the door liner 120 and the outer plate 110.

Accordingly, after the cap decorations 112 are assembled with each of the upper and lower ends of the outer plate 110 and the door liner 120, the predetermined empty space may be defined between the outer plate 110 and the door liner 120, and the liquid foam may be filled in the empty space.

The filling S240 may be the process of forming the insulator 130 by filling the liquid foam in the space between the outer plate 110 and the door liner 120. That is, the filling S240 may be the process of filling the polyurethane (PU) liquid foam in the space when the assembling of the cap decorations at S220 and the assembling of the door liner at S230 are performed and the predetermined space is defined between the outer plate and the door liner.

As illustrated in FIG. 5E, the filling S240 may be the process of forming the insulator 130 in the space between the outer plate 110 and the door liner 120. That is, the filling S240 may be the process of injecting the undiluted solution of the rigid polyurethane (PU) into the space between the outer plate 110 and the door liner 120.

In some examples, the liquid foam can be injected through a separate inlet.

In addition, the filling S240 may be performed after the soft polyurethane (PU) applied to the rear surface of the outer plate 110 in the spraying S210 has been dried.

In some implementations, an elasticity of the foam cushion 140 can be greater than an elasticity of the insulator 130. That is, as described above, the hardness of the foam cushion 140 may be 20 to 30, and the hardness of the insulator 130 may be 60 to 70.

Accordingly, the foam cushion 140 may be expanded or contracted in correspondence to the contraction and expansion of the insulator 130, and may fill the gap between the outer plate 110 and the door liner 120.

Accordingly, the example of the contraction and expansion of the foam cushion 140 in the filling S240 is illustrated in FIGS. 6A, 6B, and 6C.

Particularly, as illustrated in FIG. 6A, when the filling S240 proceeds in state in which the foam cushion 140 is formed to have a predetermined thickness, the liquid foam may be injected and expanded. Accordingly, as illustrated in FIG. 6B, the foam cushion 140 may be contracted by being pushed due to the expansion of the liquid foam.

Next, when the liquid foam (the insulator) filled in the door 100 contracts, the volume of the foam cushion 140 may be expanded due to the elasticity thereof. State in this case is illustrated in FIG. 6C.

Accordingly, the foam cushion 140 may be contracted or expanded in correspondence to the change of the volume of the insulator 130 filled in the door, and may fill the gap inside the door 100.

In some examples, when the assembling of the door 100 is completed, the liquid foam may be injected to the inside of the door 100. In addition, the liquid foam may be injected through the inlet formed in the cap decorations 112 or the door liner 120.

In some implementations, the liquid foam having a high temperature may be injected to the inside of the door 100, and be in contact with the foam cushion 140. Accordingly, the foam cushion 140 made of the polyurethane (PU) may be combined with the liquid foam which is the insulator 130 made of the same material as the material of the foam cushion, and the liquid foam may evenly spread along the rear surface of the foam cushion 140.

Accordingly, even while the liquid foam is being injected, the liquid foam may expand as illustrated in FIG. 6B, and may press the foam cushion 140 in contact with the liquid foam. Accordingly, due to the pressure of the liquid foam, the polyurethane foam of the foam cushion 140 may be compressed and the thickness thereof may become thinner.

In addition, when a predetermined time passes after the injection of the liquid foam, gas occurring during the filling may be discharged, and as the liquid foam cools, the liquid foam may stabilize and harden, and thus may form the insulator 130.

In this case, as illustrated in FIG. 6C, the liquid foam may be relatively contracted and the pressure of pressing the foam cushion 140 may be decreased and released. Accordingly, the polyurethane foam of the foam cushion 140 may be restored according the release or decrease of the pressure of the liquid foam, so the thickness of the foam cushion may become thicker than the thickness of the foam cushion in FIG. 6B or may be restored to the initial thickness of the foam cushion.

Accordingly, in the initial stage of the injection of the liquid foam, the polyurethane foam of the foam cushion 140 may be compressed, and after a predetermined time, the foam cushion 140 may act as a buffer in the process of the restoration of the polyurethane foam thereof.

When a predetermined time passes after the filling of the liquid foam is completed, the liquid foam may be completely solidified and form the insulator 130. In this case, the insulator 130 may have an even thickness on the entire surface of the foam cushion 140, and may be filled in the entirety of the inside of the door 100.

As illustrated in FIG. 5F, the assembling of the gasket at S250 is the process of assembling the gasket 124 with the perimeter of the door liner 120.

Accordingly, after the assembling of the gasket 124 is performed, the assembling of the door 100 is completed.

The scope of the present disclosure is not limited to the implementations illustrated above, and within the technical scope as described above, many other modifications based on the present disclosure will be possible for those skilled in the art.

For example, in some implementations, the foam cushion 140 can be provided in the refrigerator door 100. In the same or other implementations, a foam cushion 140 can be provided in one or both of the cabinet 10 and the refrigerator door 100.

In some implementations, the cabinet 10 of the refrigerator can include an outer casing made of metal such as steel, and an inner casing having the storage space defined inside the refrigerator and made of plastic. In addition, the insulator formed by the injection of the liquid foam may be formed in the outer casing and the inner casing.

In some implementations, the foam cushion 140 can be provided on the inner surface of the outer casing by the spray application method. Accordingly, the outer casing may not have a curve which may occur during the injection of the liquid foam.

In some implementations, the foam cushion 140 can be provided in the inner casing by the automatic application of the liquid foam including, for example, the spray application method.

What is claimed is:

1. A method for manufacturing a refrigerator door, the method comprising:
    supplying an outer plate;
    spraying soft polyurethane to a rear surface of the outer plate to thereby define a foam cushion on the rear surface of the outer plate;
    coupling a cap decoration to an upper or lower end of the outer plate;
    coupling a door liner to the outer plate to thereby define a space between the door liner and the outer plate;
    based on the soft polyurethane on the rear surface of the outer plate being dried, filling liquid foam in the space defined between the door liner and the outer plate, the liquid foam including an insulator; and
    coupling a gasket to a perimeter of the door liner
    wherein an elasticity of the foam cushion is greater than an elasticity of the insulator such that the foam cushion on the rear surface of the outer plate expands or contracts in response to contraction or expansion of the insulator to thereby fill a gap between the outer plate and the door liner.

2. The method of claim 1, wherein the soft polyurethane applied to the rear surface of the outer plate has a first thickness.

3. The method of claim 2, wherein the foam cushion has a second thickness that is greater than the first thickness and in a range from 2 mm to 3 mm.

4. The method of claim 1, wherein filling the liquid foam comprises injecting undiluted solution of rigid polyurethane into the space between the outer plate and the door liner.

5. The method of claim 1, wherein a ratio of a hardness of the foam cushion to a hardness of the insulator is 2-3:6-7.

6. The method of claim 1, wherein the foam cushion has:
    a front surface that is in contact with the rear surface of the outer plate; and
    a rear surface that is in contact with the insulator provided in the space defined between the door liner and the outer plate.

7. The method of claim 1, wherein a thickness of the foam cushion on the rear surface of the outer plate is less than a thickness of the insulator provided in the space defined between the door liner and the outer plate.

* * * * *